United States Patent [19]
Murai

[11] Patent Number: 5,383,220
[45] Date of Patent: Jan. 17, 1995

[54] DATA DEMODULATOR OF A RECEIVING APPARATUS FOR SPREAD SPECTRUM COMMUNICATION

[75] Inventor: Hideshi Murai, Kamakura, Japan

[73] Assignee: Mitsubishi Denki Kabushiki Kaisha, Tokyo, Japan

[21] Appl. No.: 227,197

[22] Filed: Apr. 13, 1994

Related U.S. Application Data

[63] Continuation of Ser. No. 82,035, Jun. 24, 1993, abandoned.

[30] Foreign Application Priority Data

Jun. 29, 1992 [JP] Japan ................................. 4-170946
Jun. 21, 1993 [JP] Japan ................................. 5-149369

[51] Int. Cl.⁶ ............................................. H04K 1/00
[52] U.S. Cl. .................................... 375/1; 380/34
[58] Field of Search ............................ 375/1; 380/34

[56] References Cited

U.S. PATENT DOCUMENTS

| | | | |
|---|---|---|---|
| 4,761,795 | 8/1988 | Beier | 375/1 |
| 4,901,307 | 2/1990 | Gilhousen et al. | |
| 4,993,044 | 2/1991 | Akazawa | 375/1 |
| 5,099,494 | 3/1992 | Kingston et al. | 375/1 |
| 5,103,459 | 4/1992 | Gilhousen et al. | |
| 5,241,561 | 8/1993 | Barnard | 375/1 |
| 5,267,260 | 11/1993 | Lee | 375/1 |

FOREIGN PATENT DOCUMENTS 4020191 6/1990 Germany .
WO92/00639 1/1992 WIPO .
WO92/02082 2/1992 WIPO .

OTHER PUBLICATIONS

P. Das et al; "The use of the Hilbert Transform to Double the Information..."; National Telecommunications Conference; IEEE Nov. 30, 1980; Houston, Tex.

IEEE Journal on Selected Areas in Communications, vol. 8 No. 4 May, 1990, pp. 503–514 "Increased Capacity Using CDMA for Communication" Gilhousen, et al.

Primary Examiner—Tod R. Swann
Attorney, Agent, or Firm—Wolf, Greenfield & Sacks

[57] ABSTRACT

A data demodulator of a receiving apparatus for spread spectrum communication for removing the phase difference remaining after detection for improving reception quality. In-phase and quadrature axis received signals are multiplied by pseudonoise codes PNI(t) and PNQ(t) and the results are averaged by averaging sections for calculating the correlation. By performing correlation processing, $pkO \cos \theta$, $-pO \sin \theta$, $pkO \sin \theta$, and $pkO \cos \theta$ are output when the amplitude of receive path signal is assumed to be $\rho$, the phase difference to be $\theta$, and a proportional constant to be $kO$. These signals are multiplied by in-phase and quadrature axis received signals and the results are added by adders, thereby removing the effect of the phase difference $\theta$. The signal is used for data demodulation and data recovery circuit.

45 Claims, 13 Drawing Sheets

DATA DEMODULATOR OF A RECEIVING APPARATUS FOR SPREAD SPECTRUM COMMUNICATION

This application is a continuation of application Ser. No. 082,035, filed Jun. 24, 1993, now abandoned.

BACKGROUND OF THE INVENTION

1. Field of the Invention

This invention relates to a data demodulator of a receiving apparatus for spread spectrum communication and more particularly to a data demodulator which removes a phase difference remaining after detection by using pilot signals not data-modulated transmitted from a base station or cell-site for improving signal quality.

2. Description of the Related Art

A spread spectrum communication system of a direct-sequence technique, which has advantages such as good resistance to interference and a property hard to give interference, is developed as one of communication systems for small capacity communication using communication satellite and mobile communication such as mobile phones, portable phones, or cordless phones.

FIG. 11 shows the schematic configuration of a receiving apparatus of a CDMA (code division multiple access) cellular telephone system disclosed in U.S. Pat. No. 5,103,459. The mobile unit CDMA telephone system contains an antenna 1 for connection through a duplexer 2 to an analog receiver 3. The antenna 1 receives spread spectrum communication signals from base stations or cell-sites and feeds the received signals via the duplexer 2 into the analog receiver 3. The analog receiver 3, which contains a down converter and analog-to-digital converter, converts (or detects) the fed signals into base band signals by the down converter and further converts the base band signals to digital signals by the analog-to-digital converter. The base band signals converted to the digital signals are fed into a searcher receiver 5 and digital data receivers (data demodulators) 6 and 7.

When spread spectrum communication signal arrive at the receiving apparatus through a plurality of paths, a difference occurs in the reception time for each signal of paths. The data demodulators 6 and 7 can select which signal of paths is to be received and tracked on respectively. If two data demodulators are installed as shown in FIG. 11, two independent paths can be tracked in parallel.

On the other hand, in response to a control signal from a control processor 8, the searcher receiver 5 scans the time domain around the nominal time of received pilot signals to detect pilot signals contained in each received multipath signals from cell-sites. The searcher receiver 5 compares the strength of one received pilot signal with that of another, and outputs the strength signal to the control processor 8 to indicate the strongest signal.

The control processor 8 provides control signals to the data demodulators 6 and 7 for each to process a different one of the strongest signals.

The function of each of the data demodulators 6 and 7 is to correlate received signals with PN codes used in transmitting part at cell-sites. FIG. 12 shows the details of data demodulator disclosed in U.S. Pat. No. 5,103,459. Each of the data demodulators 6 and 7 contains PN generators 516 and 518 which generate PN codes PNI(t) and PNQ(t) for the in-phase axis and quadrature axis respectively corresponding to received path signals. The data demodulator 6, 7 also contains a Walsh function generator 520 generating the Walsh function appropriate for the cell-site to communicate with the mobile unit. The Walsh function generator 520 generates a code sequence corresponding to a Walsh function assigned in response to a select signal from the control processor 8. The select signal is transmitted by the cell-site to the mobile unit as a part of a call setup message. Outputs of the PN generators 516 and 518, PN codes PNI(t) and PNQ(t), are input to exclusive-OR gates 522 and 524 respectively. The Walsh function generator 520 supplies its output to the exclusive-OR gates 522 and 524 where the signals are then exclusive-OR'ed together to generate sequences PNI'(t) and PNQ'(t).

The sequences PNI'(t) and PNQ'(t) are input to a PN QPSK correlator 526 for processing, and outputs of the PN QPSK correlator 526, I and Q, are fed into accumulators 528 and 530 respectively. The accumulators 528 and 530 integrate (accumulate and add) the input signals over the 1-symbol time. As a result, the correlation between PNI'(t) and in-phase axis received signal and that between PNQ'(t) and quadrature axis received signal are calculated by the PN QPSK correlators 526 and the accumulators. The accumulator outputs are input to a phase rotator 532. The phase rotator 532 also receives a pilot phase signal from the control processor 8. The phase of receive symbol data is rotated according to the phase of the pilot signal. The pilot signal phase is determined by the searcher receiver and the control processor. The output of the phase rotator 532, data on in-phase axis, is supplied to a combiner and decoder circuit.

With the conventional receiving apparatus, the analog receiver which down converts (or detects) received signals into base band signals and further converts into digital signals processes the signals passed through all paths in common, as described above. However, the received signals passed through the paths have carrier phases independent of each other. If the receive signals are passed through a single path, the phase of the received signal can be controlled by a carrier recovery circuit, but if the received signals are passed through a plurality of paths, their phases cannot be controlled because of plurality of independent carrier phases. Therefore, inevitably the input signals to each digital data receiver includes the carrier phase difference between a received path signal and recovered carrier using for down converting (so called phase difference remaining after detection). When the phase differences exist, received signal components of in-phase axis and quadrature axis mixes with each other.

As with the communication system disclosed in U.S. Pat. No. 5,103,459, assume that data modulation and Walsh function modulation for user identification are bi-phase shift keying (BPSK) and spread modulation is quadrature phase shift keying (QPSK). Complex envelope of transmitted signal, S(t), is $$S(t) = W(t)[PNI(t) + jPNQ(t)]$$

where W(t) is a multiplex signal of the transmit signals and pilot signals to each user. Assuming that modulation data to the ith user is $d_i(t)$, the Walsh function is $W_i(t)$, and the number of multiplexed signals is N, $$W(t) = \Sigma d_i(t) W_i(t)$$

where i=1 to N.

Next, assume that the reception amplitude (envelope) of a received path signal is $\rho$ and the phase difference between the carrier of the received path signal and the recovered carrier multiplied at the analog receiver for down converting (carrier phase difference remaining after detection) is $\rho$. The complex envelope of the received path signal component to be demodulated including in the output of analog receiver is $$\begin{aligned}Rx(t) &= \rho S(t) * \exp(j\theta) \\ &= \rho W(t) [PNI(t) + j\, PNQ(t)] [\cos\theta + j\sin\theta] \\ &= \rho W(t) [\{PNI(t)\cos\theta - PNQ(t)\sin\theta\} + \\ &\quad j\{PNI(t)\sin\theta + PNQ(t)\cos\theta\}].\end{aligned}$$

That is, the in-phase axis received signal is $\rho W(t)\{PNI(t)\cos\theta - PNQ(t)\sin\rho\}$, and the quadrature axis received signal is $\rho W(t)\{PNI(t)\sin\theta + PNQ(t)\cos\rho\}$. Thus, the in-phase axis received signal and quadrature axis received signal include a different signal component with each other (a component related to PNQ(t) in the in-phase axis and a component related to PNI(t) in the quadrature axis). Therefore, compensation processing is required. Formerly, for example, a PN QPSK correlator as shown in FIG. 13 is provided with multipliers which multiply in-phase axis and quadrature axis received signals by PN codes of both in-phase and quadrature axes, and the multiplier outputs are added in a predetermined combination.

At the PN QPSK correlator in FIG. 13, each of the in-phase axis and quadrature axis received signals is multiplied by the PN code PNI(t) for the in-phase axis and the PN code PNQ(t) for the quadrature axis, and the results are added together in combinations shown in FIG. 13. That is, output I is $$I=\rho W(t)[PNI'(t)\{PNI(t)\cos\theta - PNQ(t)\sin\theta\} + PNQ'(t)\{PNI(t)\sin\theta + PNQ(t)\cos\theta\}]$$

Output Q is $$Q=\rho W(t)[-PNQ'(t)\{PNI(t)\cos\theta - PNQ(t)\sin\theta\} + PNI'(t)\{PNI(t)\sin\theta + PNQ(t)\cos\theta\}]$$

The outputs I and Q are integrated by the accumulators 528 and 530 respectively over the symbol time. Of the integration results, only the component of di(t) multiplied by Wi(t) contained in PNI', PNQ' in the multiplexed signals remains due to orthogonality of the Walsh function. For example, assuming that the symbol time is T, the following relationship becomes true:

$$\begin{aligned}\int PNI'(t)\,PNI(t)\,W(t)\,dt &= \int [PNI(t)\,Wi(t)]\,PNI(t)\,W(t)\,dt \\ &= \int [PNI(t)\,Wi(t)]\,PNI(t)\,[\Sigma di(t)\,Wi(t)]dt \\ &= \int PNI^2(t)\,Wi(t)\,[\Sigma di(t)\,Wi(t)]dt \\ &= \int Wi(t)\,[\Sigma di(t)\,Wi(t)]dt \\ &= Tki \cdot di(t)\end{aligned}$$

where ki is a ratio constant related to the power allocation percentage of the multiplex signal. Therefore, the outputs of the accumulators 528 and 530 become $2\rho ki\cdot di(t)\cos\theta$ and $2\rho ki\cdot di(t)\sin\theta$ respectively. This assumes that the correlation processing timing is given by a timing recovery circuit and that the cross-correlation value between PNI(t) and PNQ(t) is sufficiently small due to one of the PN code characteristics and may be ignored by correlation processing. Now in-phase axis and quadrature axis received signals are separated efficiently, but the effect of $\cos\theta$ remains in the output of the accumulator 528 and that of $\sin\theta$ remains in the output of the accumulator 530. To remove these effects, for example, calculation of $\theta=\tan^{-1}(Q/I)$ is executed and phase rotation operation is performed in response to the resultant $\theta$, thereby providing $2\rho$ ki·di(t). However, complicated steps of calculation of $\tan^{-1}$ to estimate $\theta$ and the phase rotation operation are required.

The data demodulator requires a timing recovery circuit (not shown in the conventional example) to provide timing to correlation processing. Generally the timing recovery circuit is constructed with DLL (delay locked loop), etc.; the correlation pulse level corresponding to the correlation processing timing must be obtained at the DLL. To obtain the correlation pulse level from the circuit configuration in FIG. 13, the square sum of the outputs of the accumulators 528 and 530 is required for removing uncertainties of phase difference $\theta$ and data di(t). With such operation, $$8\rho^2 ki^2\cdot di^2(t)[\cos^2\rho+\sin^2\theta]=8\rho^2 ki^2\cdot di^2(t)$$

is obtained, and by integrating over the data demodulation interval time, a component corresponding to the power of correlation pulse is obtained. However, in this method, noise contained separately in both the in-phase axis and quadrature axis received signals mix with each other by the square operation and the noise effect becomes greater and it degrades the timing recovery characteristic. In order to avoid square sum operation, correlation pulses of pilot signals which are not data-modulated may be used after the effect of phase difference is removed.

However, in the conventional configuration, complicated processing of calculation of $\tan^{-1}$ to estimate $\theta$ and phase rotation operation is required. To use the correlation pulses of pilot signals at the DLL, the sequences PNI'(t) and PNQ'(t) used at the PN QPSK correlator must be generated from the Walsh function corresponding to pilot signal and PN code; another PN QPSK correlator for the DLL is required in addition to the PN QPSK correlator for data demodulation. Further, since correlation processing must be performed at the timings slightly shifted before and after from the data demodulation timing at the DLL, additional two systems for such complicated processing are required in addition to the data demodulation system; an enormous amount of operations must be performed.

Thus, the data demodulator of the conventional receiving apparatus for spread spectrum communication has a problem of complicated processing required to remove the effect of the phase difference remaining after detection. Timing reproduction also requires either the processing of the square sum of PN QPSK correlator output or the processing of phase correction; if the square sum is processed, the noise effect degrades the timing recovery characteristic or if phase correction is processed, complicated operation is required.

SUMMARY OF THE INVENTION

Accordingly, it is an object of the invention to provide a data demodulator of a receiving apparatus for spread spectrum communication which can adopt a simple configuration for removing a phase difference to perform data demodulation and timing recovery circuit for improvement of reception quality.

To the end, according to one embodiment of the invention, there is provided a data demodulator of a receiving apparatus for spread spectrum communication which receives a spread spectrum modulated signal for an in-phase axis and an quadrature axis by direct-sequence technique with in-phase axis and quadrature axis pseudonoise codes and recovers data from the received signal. The data demodulator comprises a correlation calculation means which multiplies an in-phase axis or quadrature axis received signal by a pseudonoise code corresponding to a pilot signal transmitted from a base station and averages the multiplication results for calculating a correlation containing an information of phase difference remaining after detection, and phase difference compensation means using the phase difference information provided by the correlation calculation means for compensating the effect of the phase difference contained in in-phase axis and quadrature axis received signals.

To the end, according to another embodiment of the invention, there is provided a data demodulator of a receiving apparatus for spread spectrum communication which receives a spread spectrum modulated signal for an in-phase axis and a quadrature axis by direct-sequence technique with in-phase axis and quadrature axis pseudonoise codes and demodulates data from the received signal. The data demodulator comprises a correlation calculation means which multiplies in-phase axis and quadrature axis received signals by in-phase axis and quadrature axis pseudonoise codes corresponding to a pilot signal transmitted from a base station and averages the multiplication results for calculating a correlation containing an information of phase difference remaining after detection, and phase difference compensation means using the phase difference information provided by the correlation calculation means for compensating the effect of the phase difference contained in in-phase axis and quadrature axis received signals.

To the end, according to a further embodiment of the invention, there is provided a data demodulator of a receiving apparatus for spread spectrum communication which receives a spread spectrum modulated signal for an in-phase axis and a quadrature axis by a direct-sequence technique with in-phase axis and quadrature axis pseudonoise codes and recovers data from the received signal. The data demodulator comprises a correlation calculation means which multiplies an in-phase axis received signal by in-phase axis and quadrature axis pseudo-noise codes corresponding to a pilot signal transmitted from a base station and averages the multiplication results for calculating a correlation containing an information of phase difference remaining after detection, and phase difference compensation means using the phase difference information provided by the correlation calculation means for compensating the effect of the phase difference contained in in-phase axis and quadrature axis received signals.

To the end, according to another embodiment of the invention, there is provided a data demodulator of a receiving apparatus for spread spectrum communication which receives a spread spectrum modulated signal for an in-phase axis and a quadrature axis by direct-sequence technique with in-phase axis and quadrature axis pseudonoise codes and demodulates data from the received signal. The data demodulator comprises a correlation calculation means which multiplies a quadrature axis receive signal by in-phase axis and quadrature axis pseudonoise codes corresponding to a pilot signal transmitted from a base station and averages the multiplication results for calculating a correlation containing an information of phase difference remaining after detection, and phase difference compensation means using the phase difference information provided by the correlation calculation means for compensating the effect of the phase difference contained in in-phase axis and quadrature axis received signals.

Thus, the data demodulator of the receiving apparatus for spread spectrum communication according to the invention contains the phase compensation circuit which removes the effect of the phase difference contained in in-phase axis and quadrature axis received signals, and uses the receive signal from which the phase difference effect is removed for data demodulation, At timing recovery, the correlation pulse component of pilot signal is also provided by a simple configuration without increasing the noise effect,

DESCRIPTION OF THE PREFERRED EMBODIMENTS

Referring now to the accompanying drawings, there are shown preferred embodiments of a data demodulator of a receiving apparatus for spread spectrum communication according to the invention.

Figure 1:
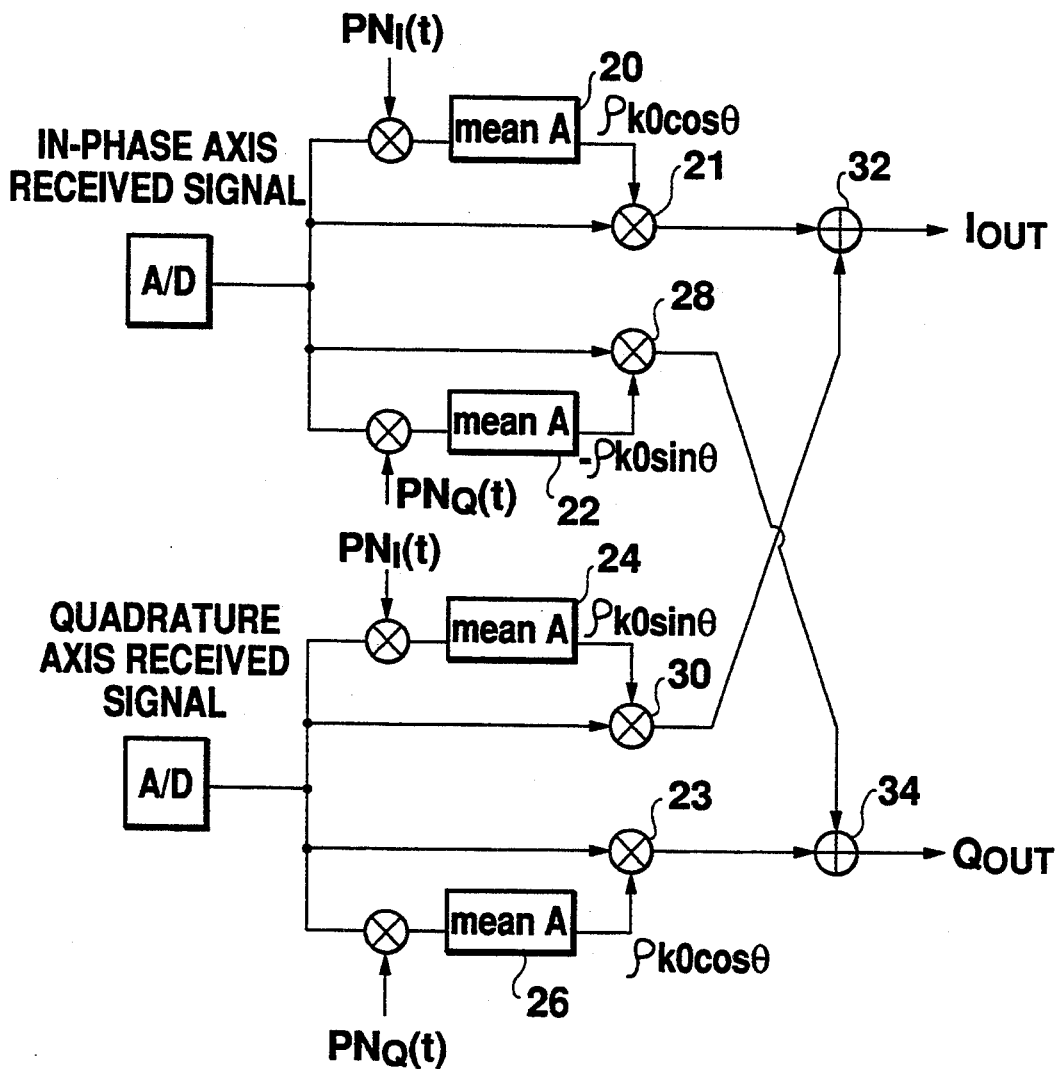
FIG. 1 is a block diagram of a phase difference compensation circuit according to a first embodiment of the invention.

FIG. 1 shows the configuration of a phase difference compensation circuit according to a first embodiment of the invention. The received signal converted into a digital signal by an A/D converter of analog receiver 3 is fed into the phase difference compensation circuit according to the embodiment. The phase difference compensation circuit is provided with a correlation calculation section which calculates the correlation between an in-phase axis received signal and in-phase axis PN code and that between a quadrature axis received signal and quadrature axis PN code. That is, an in-phase axis received signal given from an in-phase axis A/D converter is multiplied by in-phase axis PN code PNI(t) and averaged by an averaging section meanA 20 for calculating the correlation. The result is then multiplied by in-phase axis received signal given from the in-phase axis A/D converter. In-phase axis received signal given from the in-phase axis A/D converter is multiplied by quadrature axis PN code PNQ(t) and averaged by an averaging section meanA 22, then is multiplied by in-phase axis received signal given from the in-phase axis A/D converter. On the other hand, a quadrature axis received signal given from a quadrature axis A/D converter, like the in-phase axis signal described above, is multiplied by PNI(t), PNQ(t) and averaged by averaging section meanA 24, 26, then is multiplied by the original quadrature axis received signal for output. The output of the multiplier 21 and the output of the multiplier 30 are added together by an adder 32 for output. The output of the multiplier 23 and the output of the multiplier 28 are added together by an adder 34 for output. Then, phase difference compensation is executed.

The phase difference compensation circuit according to the embodiment has the configuration described above. The operation of the phase difference compensation circuit is as follows. The received path signal component supplied from the analog receiver 3 is $$\rho W(t)(PNI(t)\cos\theta - PNQ(t)\sin\theta) + j\rho W(t)(PNQ(t))\cos\theta + PNI(t)\sin\theta)$$

where in-phase axis received signal is the first term on the right-hand side of the equation and quadrature axis received signal is the second term on the right-hand side of the equation. Therefore, when the in-phase axis received signal $\rho W(t)$ (PNI(t) cos $\theta$ − PNQ(t) sin $\theta$) is multiplied by PNI(t) and further averaged by the averaging section meanA 20, output is $$(1/T)\int W(t)(PNI(t)\cdot PNI(t)\cos\theta - PNI(t)PNQ(t)\sin\theta)dt = \rho k0\cos\theta$$

because of orthogonality of the Walsh function, in which $(1/T)\int (PNI(t)\ PNI(t))\ dt=1$, and $(1/T)\int (PNI(t)\ PNQ(t))\ dt$ may be sufficiently small by averaging processing. Although the analog receiver output often contains another received path signal component, the PN codes multiplied them have different timing, thus it may be sufficiently small by averaging processing. k0 is a proportional constant corresponding to the power allocation percentage to the pilot channel (W0(t): All 1).

When in-phase axis received signal is multiplied by PNQ(t) and further averaged by the averaging section meanA 22 the resultant signal is $$(1/T)\int \rho\ W(t)\ (PNQ(t)\ PNI(t))\ \cos\theta -$$
$$PNQ(t)\ PNQ(t)\ \sin\theta)\ dt = -\rho k0\ \sin\theta$$

where $(1/T)\int (PNQ(t)PNQ(t))\ dt=1$. Likewise, for the quadrature axis received signal, output from the averaging section meanA 24 is $$(1/T)\int \rho\ W(t)\ (PNI(t)\ PNQ(t))\ \cos\theta +$$
$$PNI(t)\ PNI(t)\ \sin\theta)\ dt = \rho k0\ \sin\theta$$

Output from the averaging section meanA 26 is $$(1/T)\int \rho\ W(t)\ (PNQ(t)\ PNQ(t))\ \cos\theta +$$
$$PNQ(t)\ PNI(t)\ \sin\theta)\ dt = \rho k0\ \cos\theta$$

In-phase and quadrature axis received signals are multiplied by the $\rho$k0 cos $\theta$, $-\rho$k0 sin $\theta$, $\rho$k0 sin $\theta$, and $\rho$k0 cos $\theta$ by the multipliers 21, 28, 30, and 23 respectively. As described above, if phase difference $\theta$ exists, receive signal is $\rho$W(t) [PNI(t)+j PNQ(t)] exp [j $\theta$]. Thus, this signal may be multiplied by exp [−j $\theta$] to remove the phase difference. That is, $$\rho W(t)\ [(PNI(t)\cos\theta - PNQ(t)\sin\theta) + j\ (PNQ(t)\cos\theta +$$
$$PNI(t)\sin\theta)]\ (\cos\theta - j\sin\theta) =$$
$$\rho W(t)\ [\cos\theta\ (PNI(t)\cos\theta - PNQ(t)\sin\theta) +$$
$$\sin\theta\ (PNQ(t)\cos\theta + PNI(t)\sin\theta)] +$$
$$j\rho W(t)\ [(-\sin\theta\ (PNI(t)\cos\theta - PNQ(t)\sin\theta) +$$
$$\cos\theta\ (PNQ(t)\cos\theta + PNI(t)\sin\theta)] =$$
$$\rho W(t)\ PNI(t) + j\rho W(t)\ PNQ(t)$$

Considering the right-hand side of the equation, the first term is the sum of the term of multiplying in-phase axis received signal by cos $\theta$ and the term of multiplying quadrature axis received signal by sin $\theta$, and the second term is the sum of the term of multiplying in-phase axis received signal by sin $\theta$ and the term of multiplying quadrature axis received signal by cos $\theta$. On the other hand, as described above, meanA 20, 22, 24, and 26 output $\rho$k0 cos $\rho$, $-\rho$k0 sin $\theta$, $\rho$k0 sin $\theta$, and $\rho$k0 cos $\theta$ respectively. Therefore, in-phase and quadrature axis received signals are multiplied by the outputs from the averaging sections meanA 20, 22, 24, and 26, and then added appropriately so as to satisfy the above-mentioned equation, thereby removing the phase difference $\theta$.

That is, in-phase axis received signal is multiplied by the output $\rho$k0 cos $\theta$ from meanA 20 by the multiplier 21 and quadrature axis received signal is multiplied by the output $\rho$k0 sin $\theta$ from meanA 24 by the multiplier 30, then the outputs of the multipliers 21 and 30 are added together by the adder 32, thereby enabling signal processing equivalent to the first term on the right of the equation.

Likewise, quadrature axis received signal is multiplied by the output $\rho$k0 cos $\theta$ from meanA 26 by the multiplier 23 and in-phase axis received signal is multiplied by the output $-\rho$k0 sin $\theta$ from meanA 22 by the multiplier 28, then the outputs of the multipliers 23 and 28 are added together by the adder 34, thereby enabling signal processing equivalent to the second term on the right of the equation. Thus, the in-phase and quadrature axis signals with no phase difference, $\rho$k0·$\rho$W(t) PNI(t) and $\rho$k0·$\rho$W(t) PNQ(t), can be obtained from the in-phase and quadrature axis received signals.

Each of this is the value multiplied by $\rho$k0 to the each of desired value, where k0 is constant and $\rho$ is useful for maximal ratio combining at the combiner and decoder.

FIGS. 2 to 6 show phase compensation circuits according to other embodiments of the invention. Each of outputs of the averaging sections 20 and 26 of the phase compensation circuit shown in FIG. 1 contains $\rho$k0 cos θ. On the other hand, outputs of the averaging sections 22 and 24 contain $-\rho kO \sin \theta$ and $\rho kO \sin \theta$. Therefore, the phase compensation function is provided by one system which finds the $\cos \theta$ component and one system which finds the $\sin \theta$ component considering the polarity.

Figure 2:
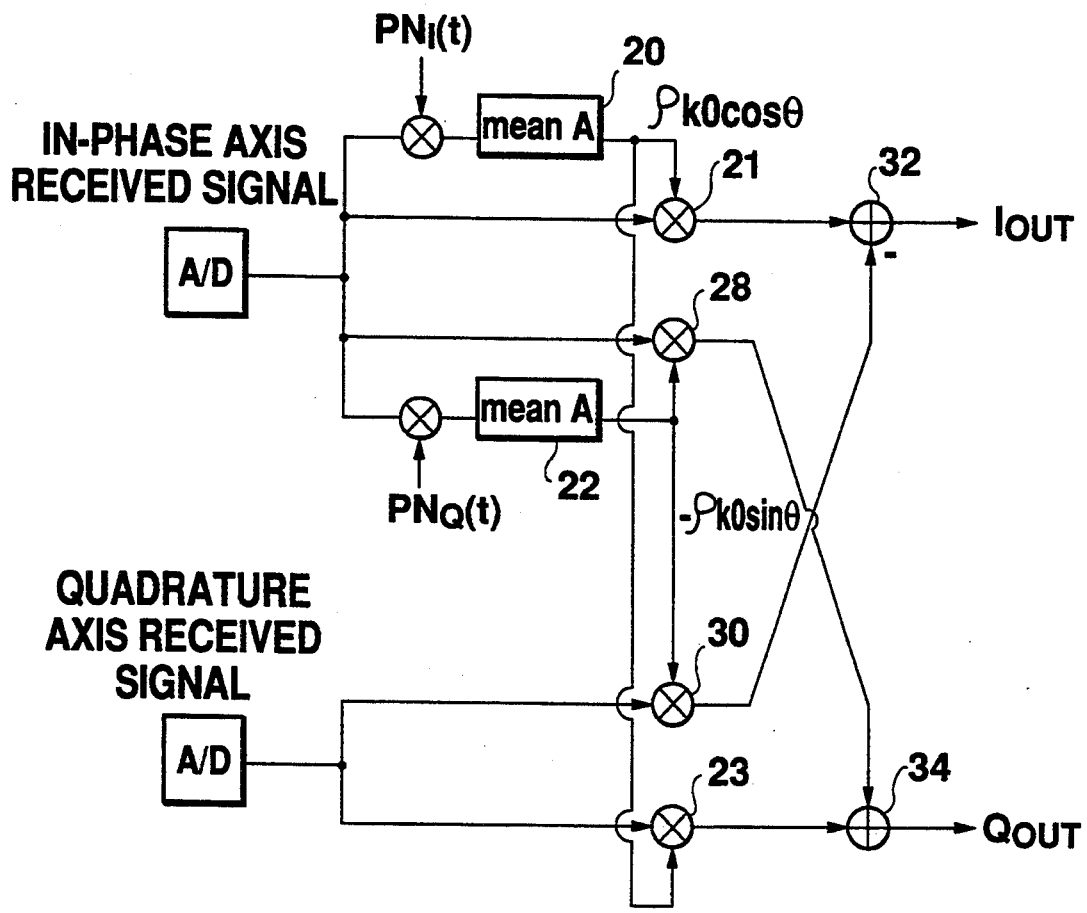
FIG. 2 is a block diagram of a phase difference compensation circuit according to a second embodiment of the invention.
Figure 3:
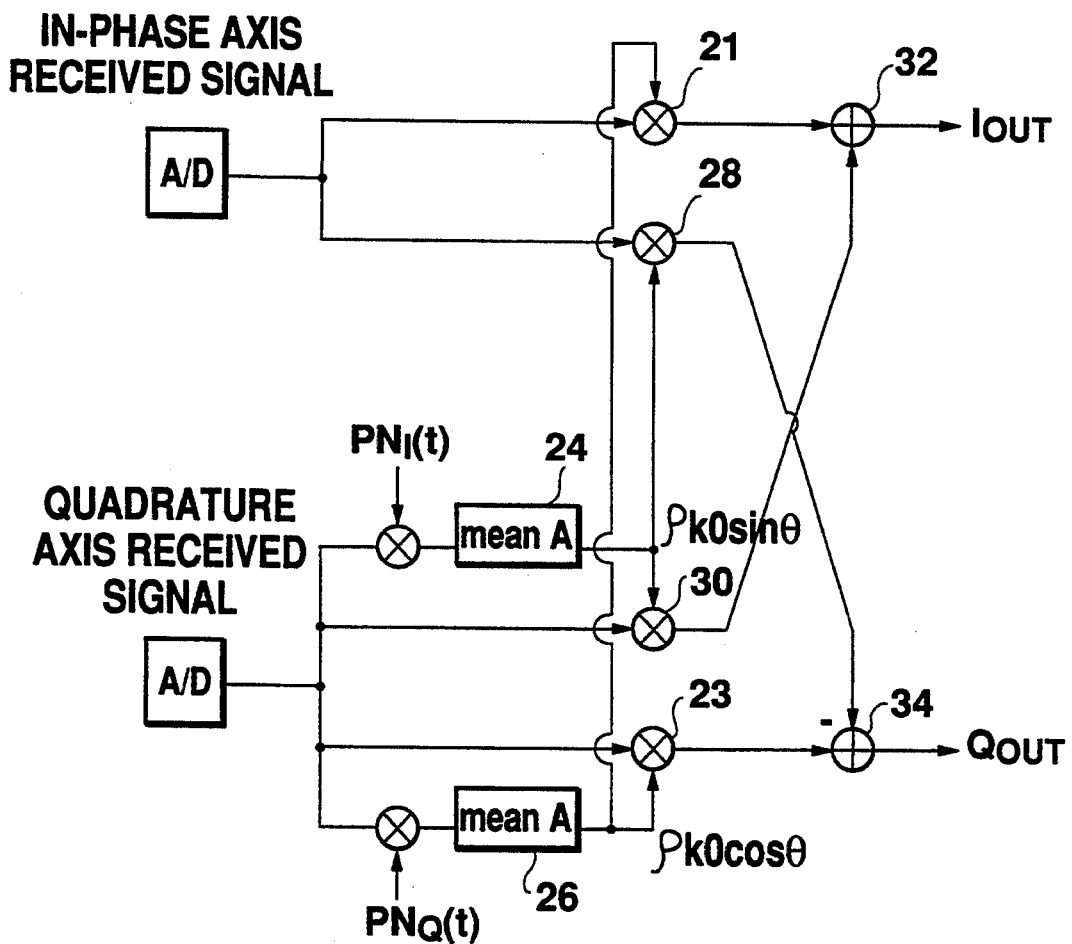
FIG. 3 is a block diagram of a phase difference compensation circuit according to a third embodiment of the invention.
Figure 4:
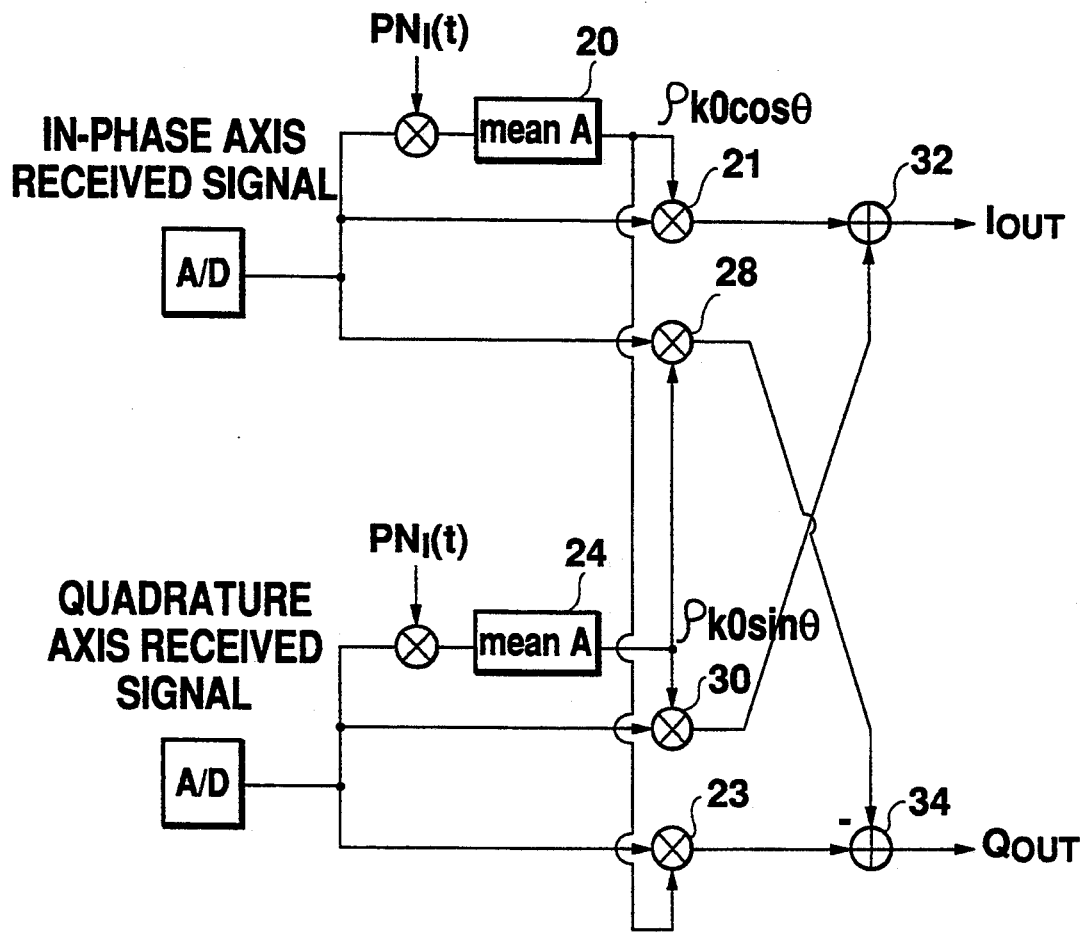
FIG. 4 is a block diagram of a phase difference compensation circuit according to a fourth embodiment of the invention.
Figure 5:
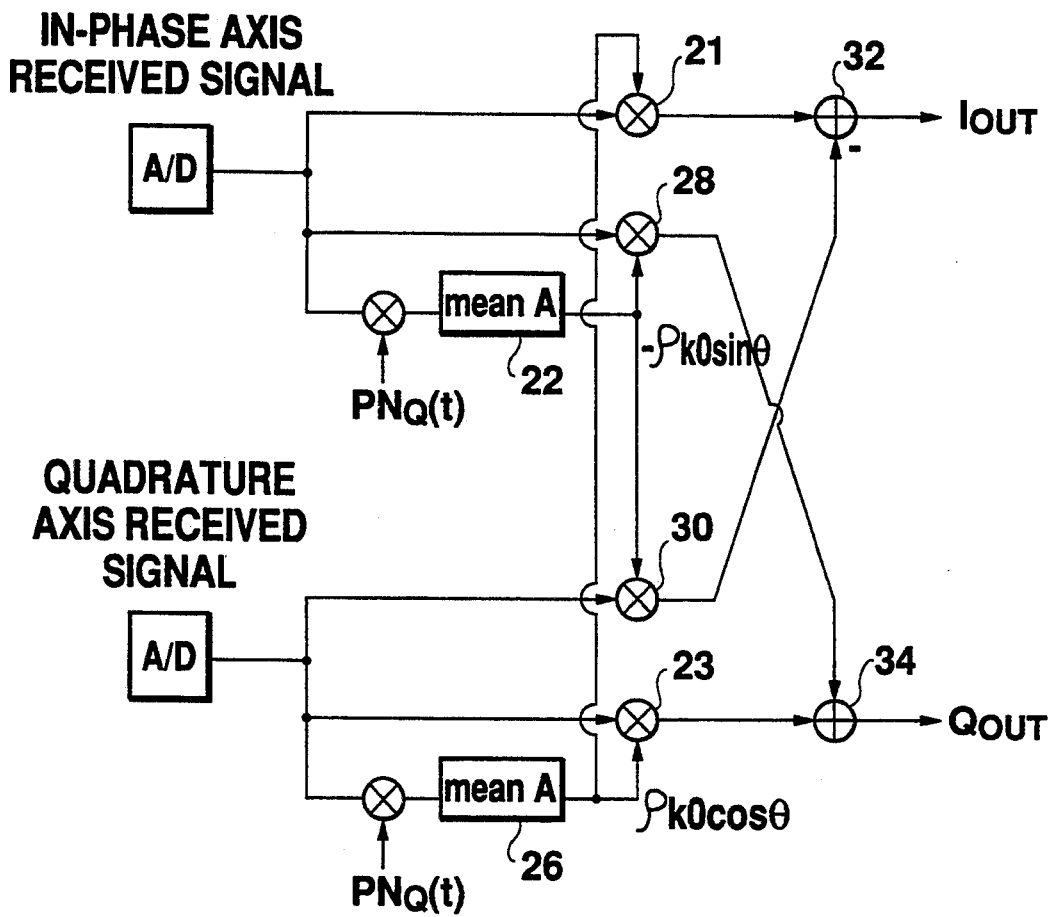
FIG. 5 is a block diagram of a phase difference compensation circuit according to a fifth embodiment of the invention.

FIG. 2 shows a configuration in which $\cos \theta$ and $\sin \theta$ components are found from an in-phase axis received signal and phase compensation is executed. FIG. 3 shows a configuration in which $\cos \theta$ and $\sin \theta$ components are found from a quadrature axis received signal and phase compensation is executed. FIG. 4 shows a configuration in which the $\cos \theta$ component is found from an in-phase axis received signal and the $\sin \theta$ component is found from a quadrature axis received signal. FIG. 5 shows a configuration in which the $\cos \theta$ component is found from a quadrature axis received signal and the $\sin \theta$ component is found from an in-phase axis received signal. To consider the polarity of the $\sin \theta$ component, one input to the adder 32 has the negative polarity in FIGS. 2 and 5 and one input to the adder 34 has the negative polarity in FIGS. 3 and 4.

Figure 6:
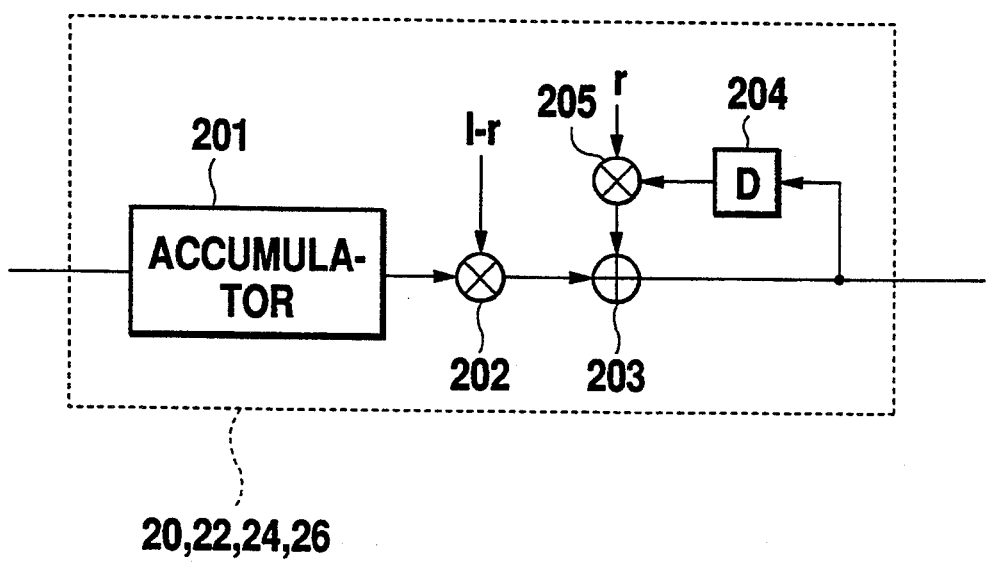
FIG. 6 is a block diagram of each averaging section in the first to fifth embodiments of the invention.

FIG. 6 shows a preferred example of the averaging sections 20, 22, 24, and 26 in FIGS. 1 to 5. An input is first fed into an accumulator 201 and integrated (accumulated and added) over the 1-symbol time, then the integration result is output every 1-symbol time. The accumulator output is fed into a recursive adding section which consists of multipliers 202 and 205, an adder 203, and a delay circuit 204 where recursive addition (accumulative addition with weighting) is performed to remove the noise effect. The delay time of the delay circuit is the 1-symbol time T and r input to the multiplier 205 ($0 \leq r < 1$), which is a weight, indicates the averaging degree by recursive addition and is set properly depending on the link condition. 1-r input to the multiplier 202 is a normalization constant used to keep the same power between input and output of the recursive adding section.

Figure 7:
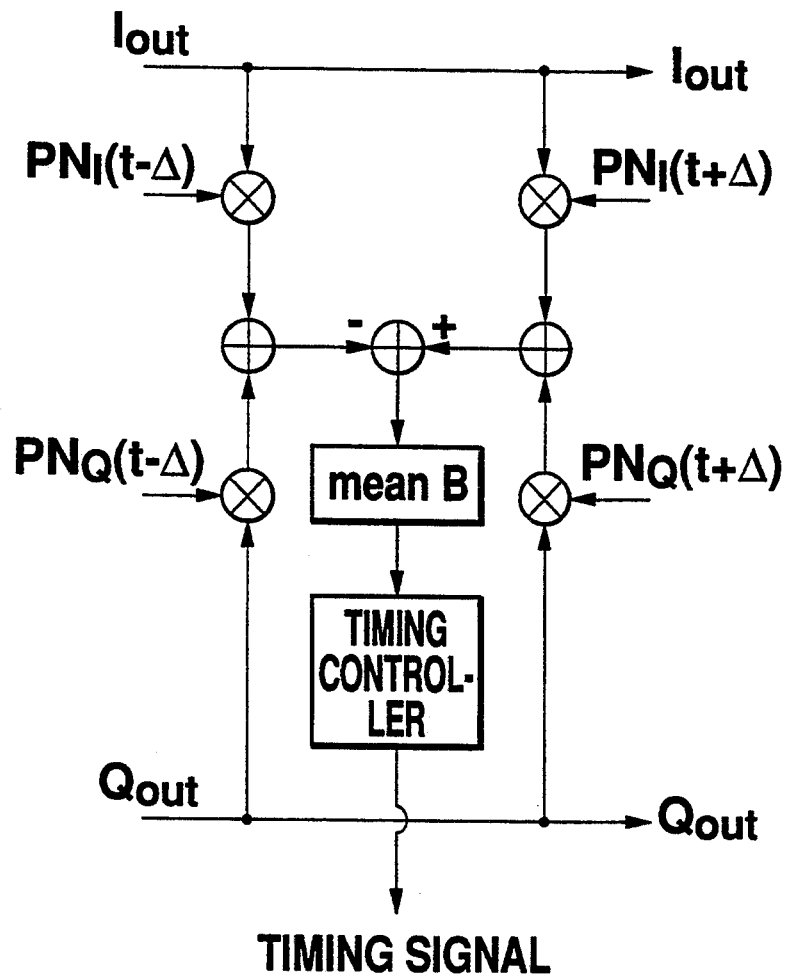
FIG. 7 is a block diagram of a DLL according to the first embodiment of the invention.

FIG. 7 shows the configuration of a DLL (delay locked loop) according to the first embodiment of the invention. Both in-phase and quadrature axis received signals from which the phase difference is removed by the phase difference compensation circuit described above are fed into the DLL. The in-phase axis received signal is multiplied by codes provided with timing shift of PNI(t) before and after by $\Delta$, PNI $(t-\Delta)$ and PNI $(t+\Delta)$. Likewise, the quadrature axis received signal is multiplied by codes provided with timing shift of PNQ(t) before and after by $\Delta$, PNQ $(t-\Delta)$ and PNQ $(t+\Delta)$. Then, the multiplication results are added together with the polarities shown in FIG. 7 and further averaged by an averaging section meanB, then input to a timing controller. Where averaging section meanB is constructed by FIG. 6 or some kind of loop filter. The timing controller outputs a timing signal so that the signal from the averaging section meanB becomes zero. The timing signal is used for the generation timing of PN codes in FIG. 1 and for a symbol clock of a data demodulator (described below) via a divider, etc. In addition, this timing signal is also supplied to the control processor 8 for comparison with the timing of a strength signal given from the searcher receiver 5 for control of a plurality of data demodulators always executing demodulation to the optimum path (strong signal path); it is also used for the diversity combining timing at the combiner and decoder circuit 9.

Figure 8:
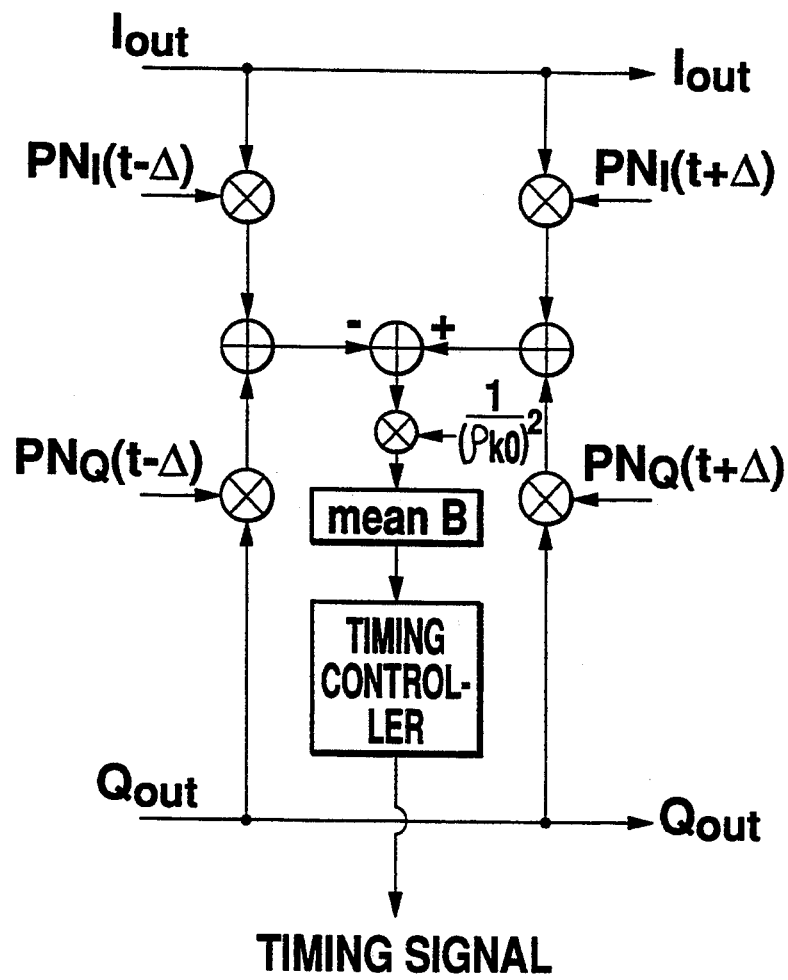
FIG. 8 is a block diagram of a DLL according to another embodiment of the invention.

FIG. 8 shows a DLL according to another embodiment of the invention. This DLL differs from the DLL shown in FIG. 7 in that it has a multiplier between an adder and averaging section B. The phase difference effect is removed from the in-phase and quadrature axis components by the phase compensation circuit and at the same time, the amplitude is multiplied by $\rho kO$, and further is multiplied by $\rho kO$ by the averaging operation of the averaging section mean B. Thus, the multiplier multiplies an adder output by $1/(\rho kO)^2$, thereby compensating fluctuation of the input level of the DLL due to fluctuation of the amplitude $\rho$ of a reception path caused by fading. Since the input level fluctuation of the DLL becomes fluctuation of loop gains, stable operation is enabled by compensation of the input level fluctuation by the multiplier.

The factor of $(\rho kO)^2$ is a coefficient corresponding to reception power of pilot signal, and can be provided by the data demodulation section described below.

Figure 9:
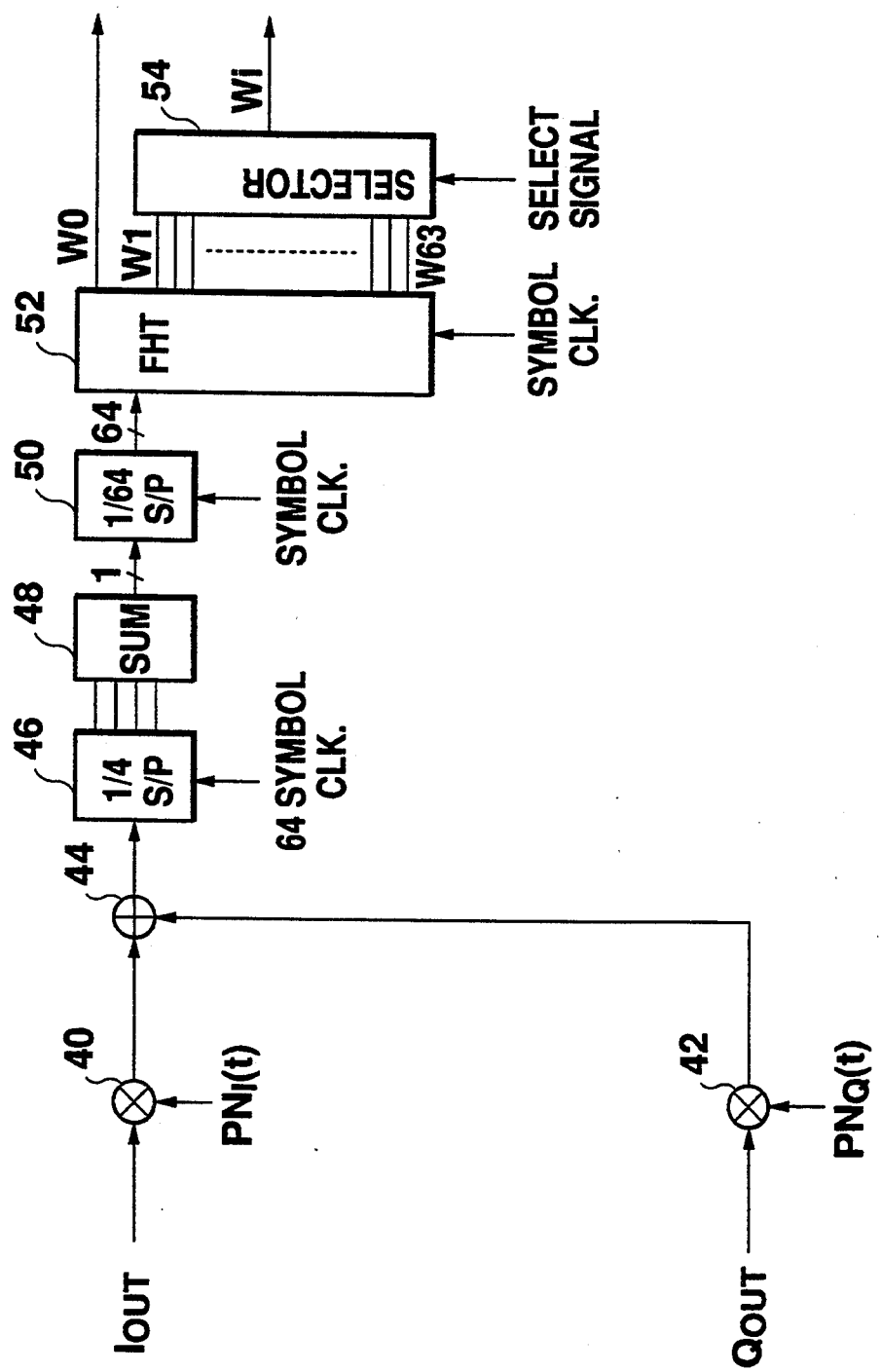
FIG. 9 is a block diagram of a data demodulation section according to the first embodiment.

FIG. 9 shows the configuration of a data demodulation section according to the first embodiment of the invention. The received base band signals from which the phase difference is removed by the phase difference compensation circuit described above are fed into the data demodulation section. The supplied in-phase and quadrature axis signals $\rho kO \cdot \rho W(t)$ PNI(t) and $\rho kO \cdot \rho W(t)$ PNQ(t) are sent to multipliers 40 and 42 respectively for multiplication by PNI (t) and PNQ (t) respectively, and the effect of PN codes are removed, then both becomes to be $\rho k\theta]W(t)$. That is, since they are multiplied at the same timing, the PN code effect is removed. The subsequent data demodulation circuit operation is to solve Walsh functions for data demodulation. Outputs from the multipliers 40 and 42 are sent to an adder 44 for addition of the in-phase and quadrature axis signals and output of the result. This step is performed to combine the same signals appearing on both channels when the effect of PN codes are removed. To improve the DLL resolution, the signals from the analog receiver may be oversampled to the chip rate. That is, a single chip may be transmitted consecutively a given number of times, such as four. To deal with such oversampling, the data demodulation section according to the embodiment is provided with a ¼ serial-parallel converter 46 and an adder 48 for restoring the overlapping chip samples to the original one chip symbol which is then sent to a 1/64 serial-parallel converter 50 at the following stage. Here, the method of adding a sample value for oversampling, but a method of extracting only one sample every four samples is also possible. The 1/64 serial-parallel converter 50 converts the input signal into parallel data of 64 chip symbols in response to symbol clock and sends the results to an FHT processor 52. The FHT processor 52 fast Hadamard transforms the received 64 chip symbol data for channel separation, then outputs correlation signals for Walsh codes W0 to W63 to a selector 54. The selector 54 selects correlation signal $2\rho^2 kOkidi(t)$ related to desired Walsh code Wi in response to the select signal supplied from the control processor 3, and sends the correlation signal to the diversity circuit, etc., for data demodulation. In the data demodulation section, synchronous tracking is performed by the pilot signal as described above, and the FHT processor 52 can be operated separately from the synchronous tracking system. Thus, it needs to be operated only at the data timing, and consumption power can be reduced. While the FHT processor 52 is outputting the correlation signals, the correlation signal for W0 becomes $2p^2kO^2$ which can be used as an input to the multiplier in FIG. 8.

Figure 10:
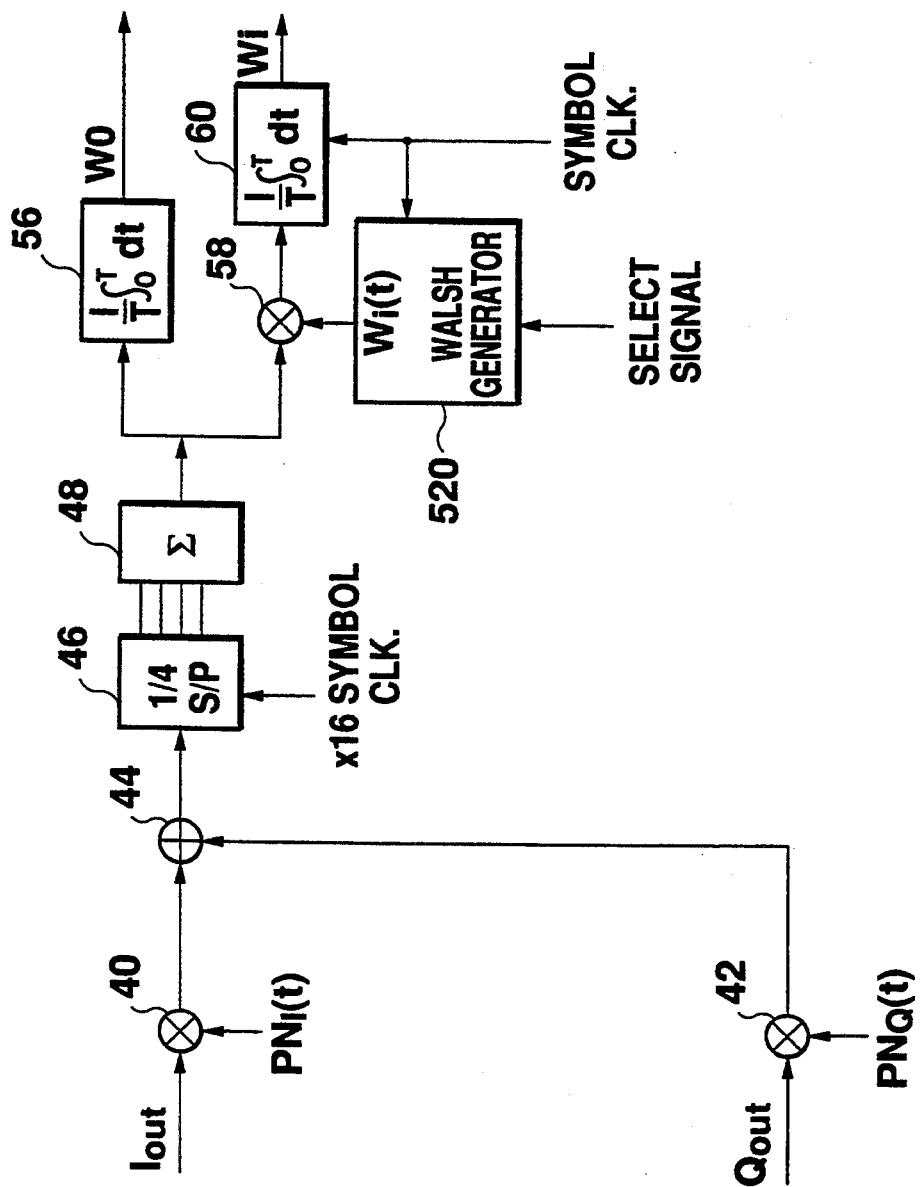
FIG. 10 is a block diagram of a data demodulation section according to another embodiment.
Figure 11:
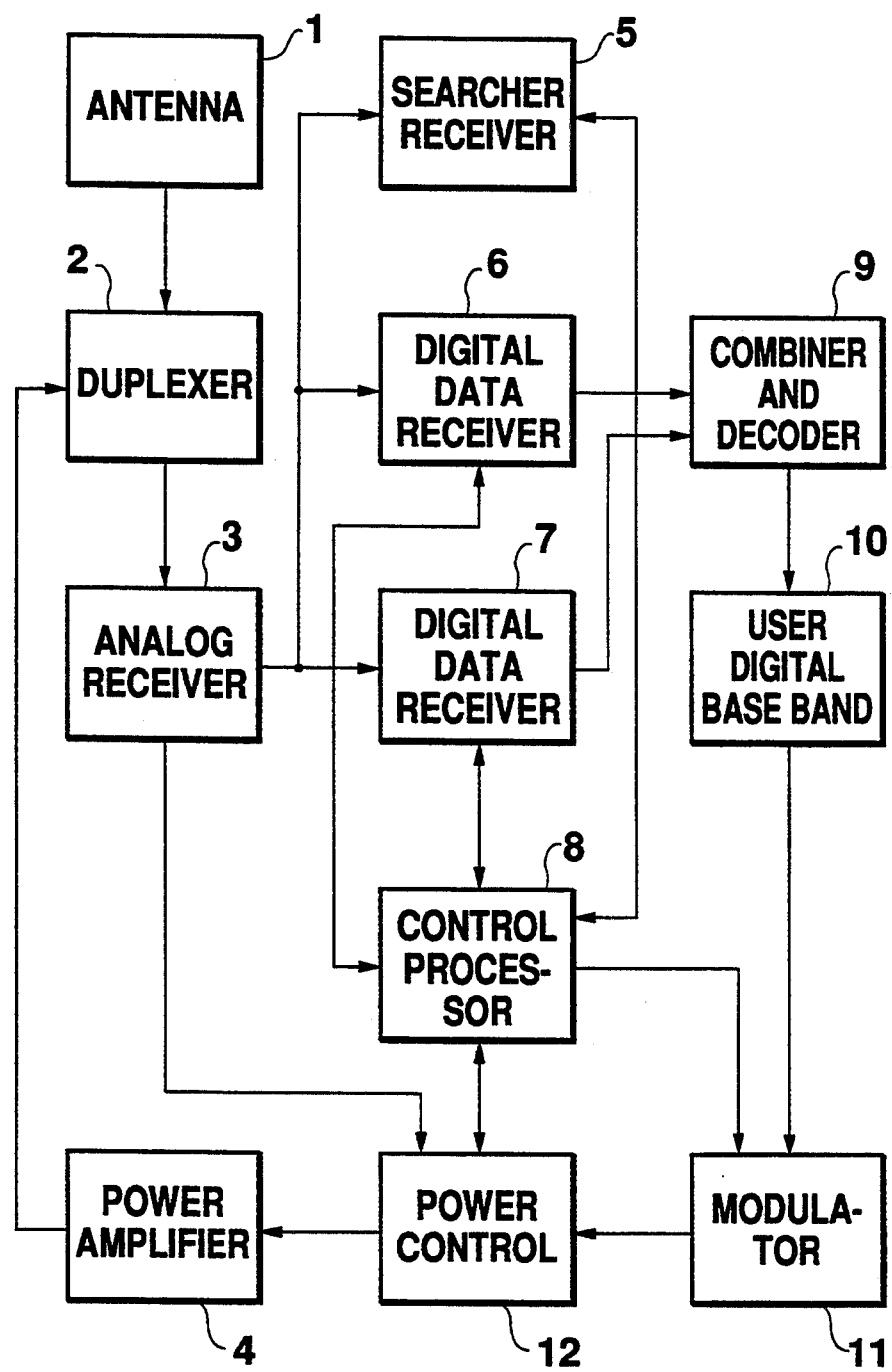
FIG. 11 is a block diagram of a conventional receiving apparatus.
Figure 12:
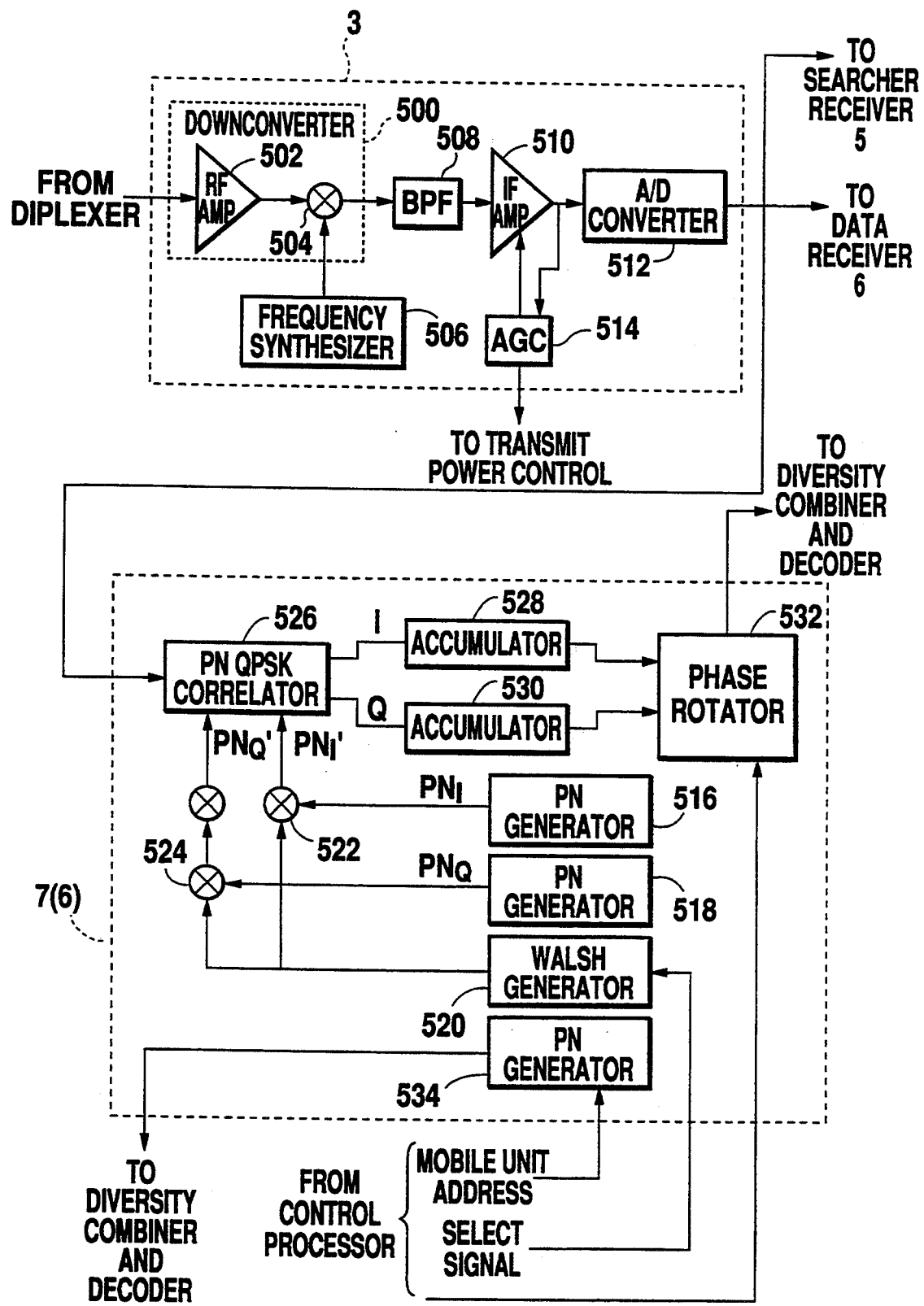
FIG. 12 is a block diagram of a data demodulator in the conventional receiving apparatus.
Figure 13:
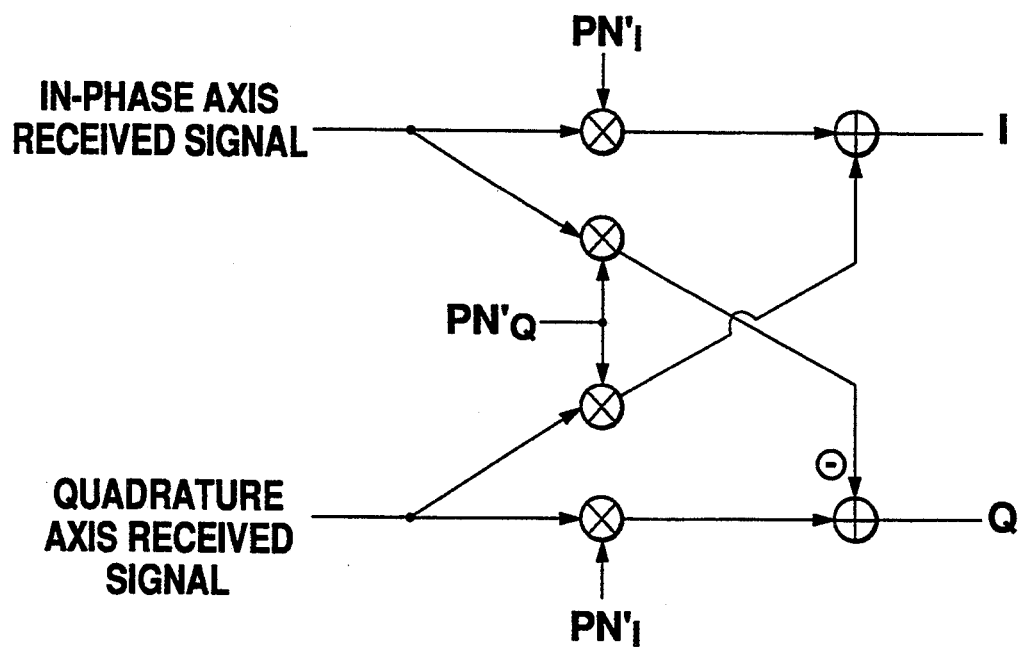
FIG. 13 is an illustration showing data demodulation principle in the conventional receiving apparatus.

Without using the FHT processor 52 at the data demodulation section according to the embodiment, data demodulation can also be executed by using a correlator which uses Walsh function generated by a Walsh function Generator according to a select signal supplied from the control processor as a reference sequence as shown in FIG. 10. An output from an adder 48 is fed into a multiplier 58 for multiplication by Walsh code Wi (t) assigned at the Walsh function generator. The result is accumulated and added by an accumulator 60 to provide $2p^2kOkidi(t)$ which is then fed into the diversity circuit. This configuration enables power to be less consumed as compared with the use of the FHT processor 52.

An output of an accumulator 56 becomes the correlation signal for W0, $2p^2kO^2$, which can be used as an input to the multiplier in FIG. 8.

The data demodulator of the receiving apparatus for spread spectrum communication can adopt a simple configuration to remove the phase difference effect for improvement of reception S/N ratio and low power comsumption.

What is claimed is:

1. A data demodulator of a receiving apparatus for spread spectrum communication which receives a spread spectrum modulated signal for an in-phase axis and a quadrature axis by a direct-sequence technique with in-phase axis and quadrature axis pseudonoise codes and recovers data from the received signal, said data demodulator comprising:

a correlation calculation means which multiplies an in-phase axis or quadrature axis received signal by a pseudonoise code corresponding to a pilot signal transmitted from a base station and averages multiplication results for calculating a correlation containing an information of phase difference remaining after detection; and phase difference compensation means using the phase difference information provided by said correlation calculation means for compensating an effect of a phase difference contained in in-phase axis and quadrature axis received signals.

2. The data demodulator as claimed in claim 1 further including:

data demodulation means for multiplying the in-phase axis and quadrature axis received signals for which the effect of the phase difference is compensated by said phase difference compensation means by in-phase axis and quadrature axis pseudonoise codes, respectively, corresponding to the pilot signal transmitted from the base station and for demodulating a signal provided by adding the multiplication results together.

3. The data demodulator as claimed in claim 2 wherein said data demodulation means uses signal processing by fast Hadamard transform (FHT) to demodulate the signal.

4. The data demodulator as claimed in claim 1 further including:

first multiplication means for multiplying the in-phase axis received signal for which the effect of the phase difference is compensated by said phase difference compensation means by in-phase axis pseudonoise codes provided by shifting the timing of an in-phase axis pseudonoise code slightly before and after;

second multiplication means for multiplying the quadrature axis received signal for which the effect of the phase difference is compensated by said phase difference compensation means by quadrature axis pseudonoise codes provided by shifting the timing of a quadrature axis pseudonoise code slightly before and after;

addition means for adding the in-phase axis and quadrature axis received signals multiplied by the pseudonoise codes by said first and second multiplication means;

means for averaging the added signals; and timing control means being responsive to the operation result of said averaging means for outputting a timing signal.

5. The data demodulator as claimed in claim 4 further including:

third multiplication means being disposed between said addition means and said averaging means for multiplying the resultant signal output by said addition means by a coefficient equivalent to a reciprocal of reception power of received pilot correlation signal and outputting the multiplication result to said averaging means.

6. The data demodulator as claimed in claim 4 further including:

pseudonoise code generation means being responsive to the timing signal fed from said timing control means for generating in-phase axis and quadrature axis pseudonoise codes.

7. The data demodulator as claimed in claim 5 further including:

pseudonoise code generation means being responsive to the timing signal fed from said timing control means for generating in-phase axis and quadrature axis pseudonoise codes.

8. The data demodulator as claimed in claim 4 further including:

demodulation means being responsive to the timing signal fed from said timing control means for demodulating received signal.

9. The data demodulator as claimed in claim 5 further including:

demodulation means being responsive to the timing signal fed from said timing control means for demodulating received signal.

10. A data demodulator of a receiving apparatus for spread spectrum communication which receives a spread spectrum modulated signal for an in-phase axis and a quadrature axis by direct-sequence technique with in-phase axis and quadrature axis pseudonoise codes and recovers data from the received signal, said data demodulator comprising:

a correlation calculation means which multiplies in-phase axis and quadrature axis received signals by in-phase axis and quadrature axis pseudonoise codes corresponding to a pilot signal transmitted from a base station and averages multiplication results for calculating a correlation containing an information of phase difference remaining after detection; and phase difference compensation means using the phase difference information provided by said correlation calculation means for compensating an effect of a phase difference contained in in-phase axis and quadrature axis received signals.

11. The data demodulator as claimed in claim 10 further including:

data demodulation means for multiplying the in-phase axis and quadrature axis received signals for which the effect of the phase difference is compensated by said phase difference compensation means by in-phase axis and quadrature axis pseudonoise codes, respectively, corresponding to the pilot signal transmitted from the base station and for demodulating a signal provided by adding the multiplication results together.

12. The data demodulator as claimed in claim 11 wherein said data demodulation means uses signal processing by fast Hadamard transform (FHT) to demodulate the signal.

13. The data demodulator as claimed in claim 10 further including:
first multiplication means for multiplying the in-phase axis received signal for which the effect of the phase difference is compensated by said phase difference compensation means by in-phase axis pseudonoise codes provided by shifting the timing of an in-phase axis pseudonoise code slightly before and after;
second multiplication means for multiplying the quadrature axis received signal for which the effect of the phase difference is compensated by said phase difference compensation means by quadrature axis pseudonoise codes provided by shifting the timing of a quadrature axis pseudonoise code slightly before and after;
addition means for adding the in-phase axis and quadrature axis received signals multiplied by the pseudonoise codes by said first and second multiplication means;
means for averaging the added signals; and
timing control means being responsive to the operation result of said averaging means for outputting a timing signal.

14. The data demodulator as claimed in claim 13 further including:
third multiplication means being disposed between said addition means and said averaging means for multiplying the resultant signal output by said addition means by a coefficient equivalent to a reciprocal of reception power of received pilot correlation signal and outputting the multiplication result to said averaging means.

15. The data demodulator as claimed in claim 13 further including:
pseudonoise code generation means being responsive to the timing signal fed from said timing control means for generating in-phase axis and quadrature axis pseudonoise codes.

16. The data demodulator as claimed in claim 14 further including:
pseudonoise code generation means being responsive to the timing signal fed from said timing control means for generating in-phase axis and quadrature axis pseudonoise codes.

17. The data demodulator as claimed in claim 13 further including:
demodulation means being responsive to the timing signal fed from said timing control means for demodulating received signal.

18. The data demodulator as claimed in claim 14 further including:
demodulation means being responsive to the timing signal fed from said timing control means for demodulating received signal.

19. A data demodulator of a receiving apparatus for spread spectrum communication which receives a spread spectrum modulated signal for an in-phase axis and a quadrature axis by direct-sequence technique with in-phase axis and quadrature axis pseudonoise codes and recovers data from the received signal, said data demodulator comprising:
a correlation calculation means which multiplies an in-phase axis received signal by in-phase axis and quadrature axis pseudonoise codes corresponding to a pilot signal transmitted from a base station and averages multiplication results for calculating a correlation containing an information of phase difference remaining after detection; and
phase difference compensation means using the phase difference information provided by said correlation calculation means for compensating an effect of a phase difference contained in in-phase axis and quadrature axis received signals.

20. The data demodulator as claimed in claim 19 further including:
data demodulation means for multiplying the in-phase axis and quadrature axis received signals for which the effect of the phase difference is compensated by said phase difference compensation means by in-phase axis and quadrature axis pseudonoise codes, respectively, corresponding to the pilot signal transmitted from the base station and for demodulating a signal provided by adding the multiplication results together.

21. The data demodulator as claimed in claim 20 wherein said data demodulation means uses signal processing by fast Hadamard transform (FHT) to demodulate the signal.

22. The data demodulator as claimed in claim 19 further including:
first multiplication means for multiplying the in-phase axis received signal for which the effect of the phase difference is compensated by said phase difference compensation means by in-phase axis pseudonoise codes provided by shifting the timing of an in-phase axis pseudonoise code slightly before and after;
second multiplication means for multiplying the quadrature axis received signal for which the effect of the phase difference is compensated by said phase difference compensation means by quadrature axis pseudonoise codes provided by shifting the timing of a quadrature axis pseudonoise code slightly before and after;
addition means for adding the in-phase axis and quadrature axis signals multiplied by the pseudonoise codes by said first and second multiplication means;
means for averaging the added signals; and
timing control means being responsive to the operation result of said averaging means for outputting a timing signal.

23. The data demodulator as claimed in claim 22 further including:
third multiplication means being disposed between said addition means and said averaging means for multiplying the resultant signal output by said addition means by a coefficient equivalent to a reciprocal of reception power of received pilot correlation signal and outputting the multiplication result to said averaging means.

24. The data demodulator as claimed in claim 22 further including:
pseudonoise code generation means being responsive to the timing signal fed from said timing control means for generating in-phase axis and quadrature axis pseudonoise codes.

25. The data demodulator as claimed in claim 23 further including:
pseudonoise code generation means being responsive to the timing signal fed from said timing control means for generating in-phase axis and quadrature axis pseudonoise codes.

26. The data demodulator as claimed in claim 22 further including:
demodulation means being responsive to the timing signal fed from said timing control means for demodulating received signal.

27. The data demodulator as claimed in claim 23 further including:
demodulation means being responsive to the timing signal fed from said timing control means for demodulating received signal.

28. A data demodulator of a receiving apparatus for spread spectrum communication which receives a spread spectrum modulated signal for an in-phase axis and a quadrature axis by direct-sequence technique with in-phase axis and quadrature axis pseudonoise codes and recovers data from the received signal, said data demodulator comprising:
a correlation calculation means which multiplies a quadrature axis received signal by in-phase axis and quadrature axis pseudonoise codes corresponding to a pilot signal transmitted from a base station and averages multiplication results for calculating a correlation containing an information of phase difference remaining after detection; and
phase difference compensation means using the phase difference information provided by said correlation calculation means for compensating an effect of a phase difference contained in in-phase axis and quadrature axis received signals 29. The data demodulator as claimed in claim 28 further including:
data demodulation means for multiplying the in-phase axis and quadrature axis received signals for which the effect of the phase difference is compensated by said phase difference compensation means by in-phase axis and quadrature axis pseudonoise codes, respectively, corresponding to the pilot signal transmitted from the base station and for demodulating a signal provided by adding the multiplication results together.

30. The data demodulator as claimed in claim 29 wherein said data demodulation means uses signal processing by fast Hadamard transform (FHT) to demodulate the signal.

31. The data demodulator as claimed in claim 28 further including:
first multiplication means for multiplying the in-phase axis received signal for which the effect of the phase difference is compensated by said phase difference compensation means by in-phase axis pseudonoise codes provided by shifting the timing of an in-phase axis pseudonoise code slightly before and after;
second multiplication means for multiplying the quadrature axis received signal for which the effect of the phase difference is compensated by said phase difference compensation means by quadrature axis pseudonoise codes provided by shifting the timing of a quadrature axis pseudonoise code slightly before and after;
addition means for adding the in-phase axis and quadrature axis received signals multiplied by the pseudonoise codes by said first and second multiplication means;
means for averaging the added signals; and
timing control means being responsive to the operation result of said averaging means for outputting a timing signal.

32. The data demodulator as claimed in claim 31 further including:
third multiplication means being disposed between said addition means and said averaging means for multiplying the resultant signal output by said addition means by a coefficient equivalent to a reciprocal of reception power of received pilot correlation signal and outputting the multiplication result to said averaging means.

33. The data demodulator as claimed in claim 31 further including:
pseudonoise code generation means being responsive to the timing signal fed from said timing control means for generating in-phase axis and quadrature axis pseudonoise codes.

34. The data demodulator as claimed in claim 32 further including:
pseudonoise code generation means being responsive to the timing signal fed from said timing control means for generating in-phase axis and quadrature axis pseudonoise codes.

35. The data demodulator as claimed in claim 31 further including:
demodulation means being responsive to the timing signal fed from said timing control means for demodulating received signal.

36. The data demodulator as claimed in claim 32 further including:
demodulation means being responsive to the timing signal fed from said timing control means for demodulating received signal.

37. A method for data demodulation in a receiving apparatus for spread spectrum communication which receives a spread spectrum modulated signal for an in-phase axis and a quadrature axis by a direct spread system with in-phase axis and quadrature axis pseudonoise codes and recovers data from the received signal, said method comprising the steps of:
multiplying at least one of an in-phase axis or quadrature axis received signal by at least one of a pseudonoise code, an in-phase axis pseudonoise code and a quadrature axis pseudonoise code corresponding to a pilot signal transmitted from a base station;
averaging the multiplication results to calculate a correlation containing an information of phase difference remaining after detection; and
compensating an effect of a phase difference contained in in-phase axis and quadrature axis received signals using said phase difference information.

38. The method of data demodulation of claim 37, further comprising the steps of:
multiplying the in-phase and quadrature axis received signals for which the effect of the phase difference is compensated by in-phase axis and quadrature axis pseudonoise codes, respectively, corresponding to the pilot signal transmitted from the base station;

adding together the results of multiplying the received signals by the pseudonoise codes to produce a added signal;

demodulating said added signal.

39. The method of data demodulation of claim 38, wherein said demodulating step uses signal processing by fast Hadamard transform (FHT).

40. The method of data demodulation of claim 37, further including the steps of:

producing a plurality of in-phase axis pseudonoise codes by shifting the timing of an in-phase axis pseudonoise code slightly before and after;

multiplying the in-phase axis received signal for which the effect of the phase difference is compensated by said plurality of in-phase pseudonoise codes;

producing a plurality of quadrature axis pseudonoise codes by shifting the timing of a quadrature axis pseudonoise code slightly before and after;

multiplying the quadrature axis received signal for which the effect of the phase difference is compensated by said plurality of quadrature pseudonoise codes;

adding the in-phase axis and quadrature axis received signals multiplied by the pseudonoise codes;

averaging the added signals; and outputting a timing signal responsive to the average of the added signals.

41. The method for data demodulation of claim 40, further comprising before said averaging step, the step of:

multiplying said added signals by a coefficient equivalent to a reciprocal of reception power of a received pilot correlation signal; and wherein said averaging step averages the product of said added signals and said coefficient.

42. The method for data demodulation of claim 40, further comprising the step of:

generating in-phase axis and quadrature axis pseudonoise codes in response to said timing signal.

43. The method for data demodulation of claim 41, further comprising the step of:

generating in-phase axis and quadrature axis pseudonoise codes in response to said timing signal.

44. The method for data demodulation of claim 40, further comprising the step of demodulating the received signal in response to said timing signal.

45. The method for data demodulation of claim 41, further comprising the step of demodulating the received signal in response to said timing signal.

* * * * *